United States Patent [19]

Francisoud et al.

[11] 4,343,668
[45] Aug. 10, 1982

[54] METHOD OF PRODUCING BUNDLES OF HOLLOW FIBRES POTTED AT THEIR ENDS

[75] Inventors: Jacques Francisoud, Oullins; Christian Ollivier, Vienne, both of France

[73] Assignee: Hospal Sodip SA, Meyzieu, France

[21] Appl. No.: 269,380

[22] Filed: Jun. 1, 1981

[30] Foreign Application Priority Data

Jun. 4, 1980 [FR] France .................................. 80 12699

[51] Int. Cl.³ ...................... B65H 54/02; B65H 81/00
[52] U.S. Cl. .................................... 156/172; 156/175; 156/356
[58] Field of Search ............... 156/169, 172, 173, 175, 156/180, 356, 425, 174, 426, 286, 441, 250; 210/321.1, 321.5; 242/18 G, 7.01, 7.02, 7.21, 53

[56] References Cited

U.S. PATENT DOCUMENTS

| 3,442,002 | 5/1969 | Geary, Jr. et al. ............... 210/321.1 |
| 3,993,816 | 11/1976 | Baudet et al. .................... 210/321.1 |
| 4,038,190 | 7/1977 | Baudet et al. .................... 210/321.1 |
| 4,077,578 | 3/1978 | Cromie et al. ..................... 242/18 G |
| 4,226,378 | 10/1980 | Fitzgerald et al. ............... 242/18 G |
| 4,276,687 | 7/1981 | Schnell ............................. 156/173 |

Primary Examiner—Michael W. Ball
Attorney, Agent, or Firm—Gerald D. Sharkin; Robert S. Honor; Walter F. Jewell

[57] ABSTRACT

A method of making a plurality of bundles of hollow fibres with potted ends in which a plurality of channels are mounted, one or each side of the periphery of a polygonal wheel, with the open side of each channel facing radially outwardly. A hollow fibre, or a hank of hollow fibres, are fed to the wheel, which is rotated so that the fibres engage in the channels, and build up therein to form a bundle in each channel.

Glue is applied by causing the fibre or fibres to engage intermittently on a glueing roller located upstream of the wheel, so that the glue is located at spaced intervals only on the fibre or fibres corresponding to the locations at which potting is required. The fibres are cut adjacent the point where the glue is applied.

The channels may form part of the final hollow fibre apparatus, in which case the glue will be allowed to adhere to the channels also.

10 Claims, 5 Drawing Figures

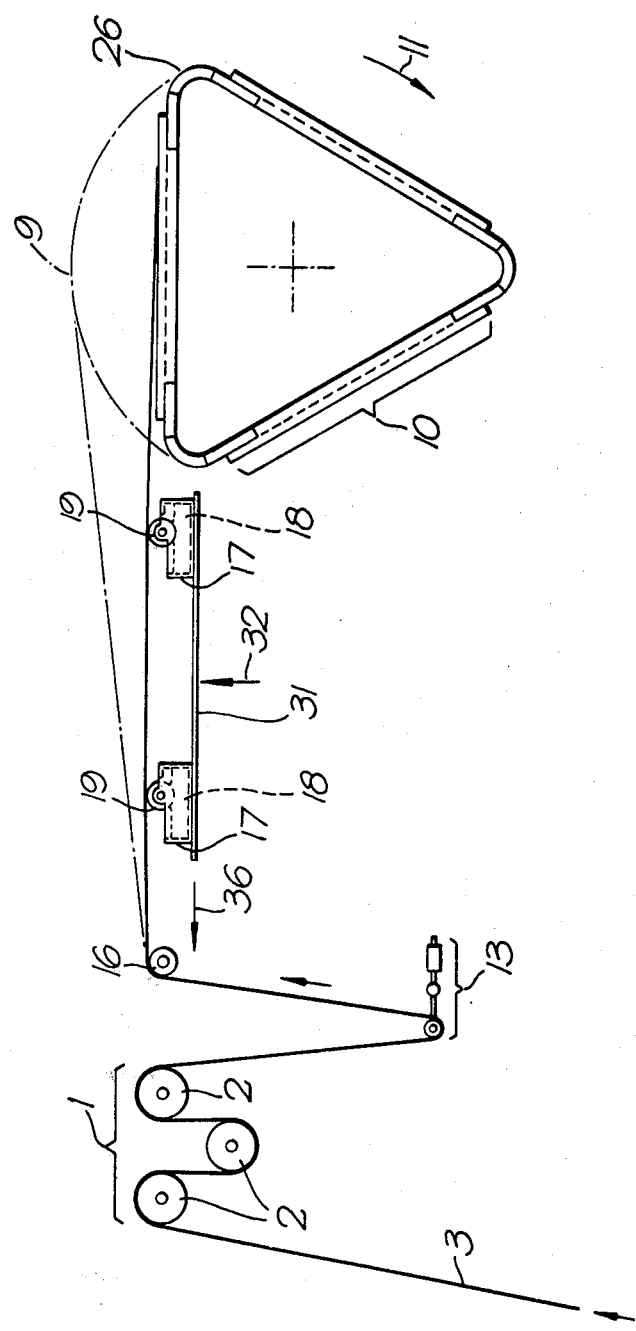

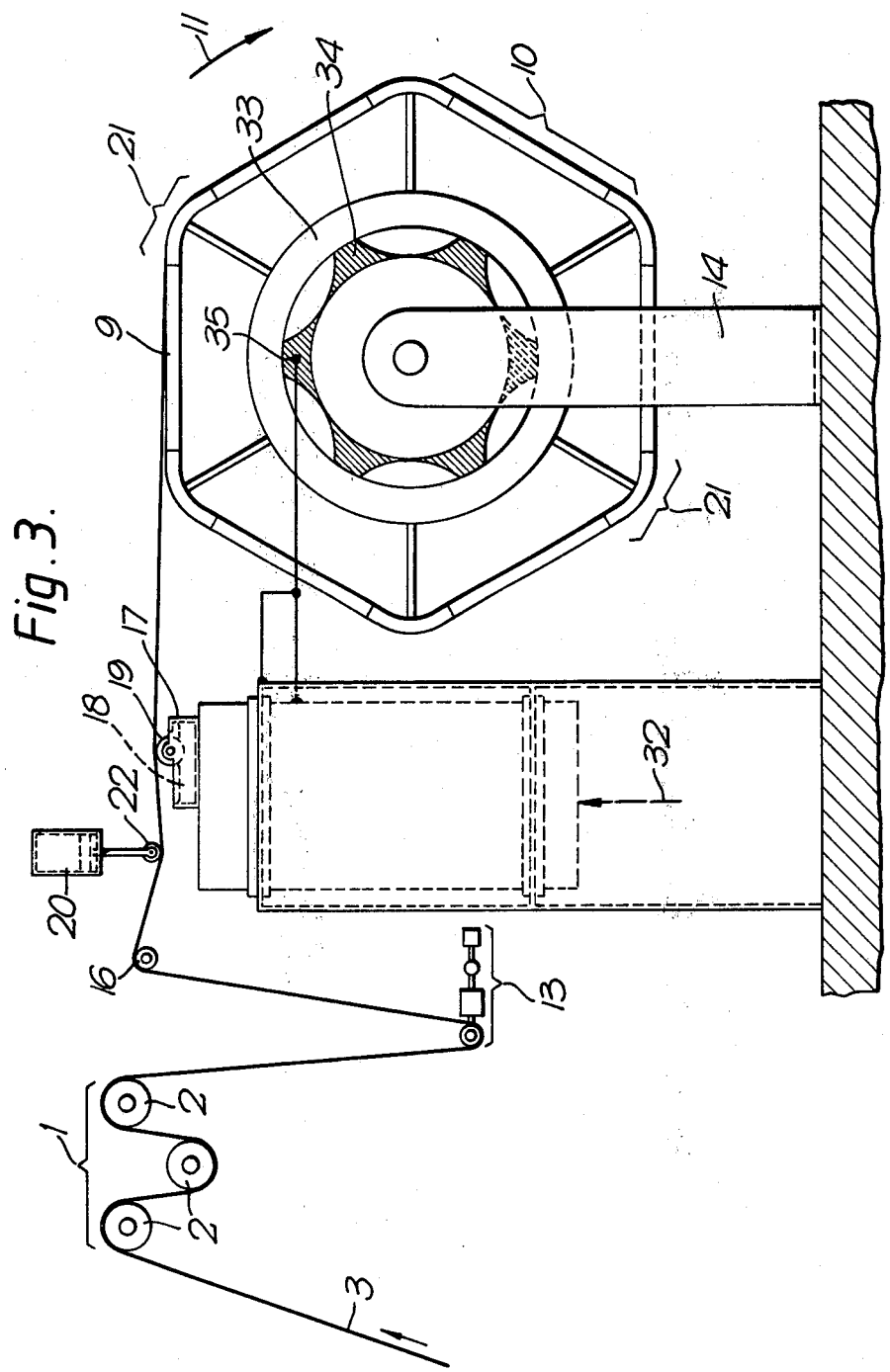

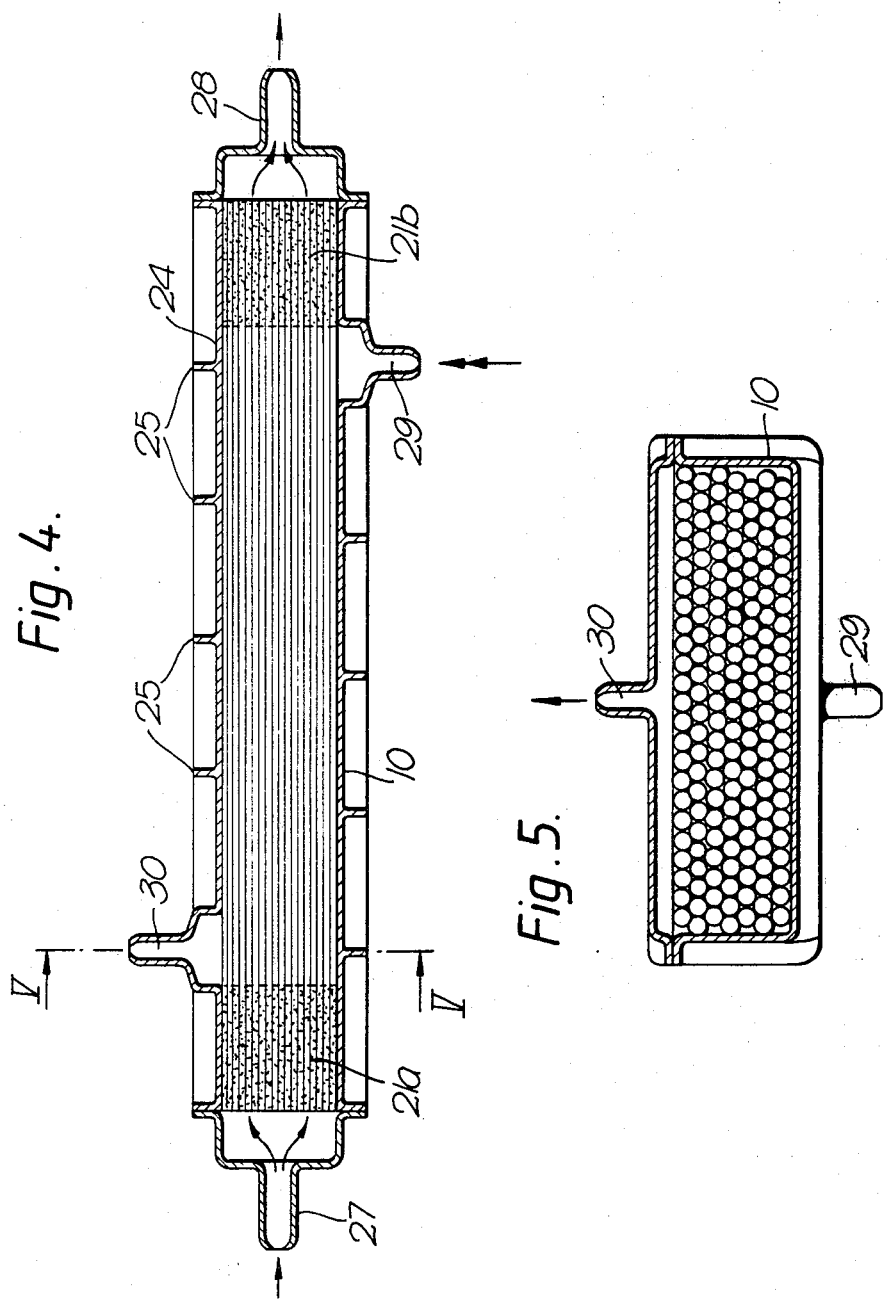

METHOD OF PRODUCING BUNDLES OF HOLLOW FIBRES POTTED AT THEIR ENDS

The present invention relates to a method of producing bundles of hollow fibres, which are potted at their ends.

Numerous methods are known for the production of bundles of hollow fibres which are potted at their ends. For example according to U.S. Pat. No. 3,730,959, the hollow fibres, arranged in a bundle, are first placed in a vessel containing an aqueous liquid in the form of a gel; only the active surface of the fibres in the bundle is placed in this gel. The end of the bundle extends beyond the gel and, for potting the fibres, an adhesive substance, the density of which is less than that of the aqueous liquid in the form of a gel, is run onto the surface of the aqueous liquid. Once the adhesive substance has solidified, the bundle is taken out of the vessel, the gel remaining around the fibres is removed by washing and the hollow fibres are opened by cutting the hardened adhesive substance. A method of this type is long and inconvenient to carry out and it is difficult to cause the adhesive substance to pass between all the hollow fibres in the bundle.

In U.S. Pat. No. 3,579,810, hollow fibres are wound around two mutually parallel rods and each rod is then dipped successively into a potting substance, which is left to harden around the fibres. This potting substance is then cut once it has hardened. A method of this type is long and inconvenient to carry out and it is difficult to cause the potting substance to pass between all the fibres and to prevent it "wicking", that is to say prevent the potting substance from climbing back along the fibres beyond the envisaged potting zone.

A method for potting hollow fibres in the form of a bundle by using an ultracentrifugation process and device is known from U.S. Pat. Nos. 3,442,002 and 3,492,698. In this method, the bundle of fibres is arranged, before potting, in an envelope constituting part of the enclosure of the final apparatus. This method, which is advantageous for potting a bundle of circular cross-section, is less suitable for potting a bundle of, for example, rectangular cross-section. Like the other methods described above, it does not make it possible to pot the two ends of the bundle simultaneously. Furthermore, this method does not readily lend itself to automation or semi-automation.

U.S. Pat. No. 4,138,460 describes a method for the production of a potted bundle of any cross-section from a tow of hollow fibres. This method essentially consists in arranging, around the tow, a mould having particular characteristics, which is composed of three parts thermally insulated from one another, a cooling fluid passing through the end parts of the mould. This method takes a long time to carry out and requires a complicated mould. Moreover, it does not make it possible to obtain a potted bundle directly in part of the enclosure which is to constitute the final hollow-fibre apparatus.

A method in which the two ends of a bundle of fibres are potted simultaneously in part of the enclosure of the final apparatus is described in U.S. Pat. No. 4,038,190. As is more especially shown in FIGS. 14 and 15 and described in column 9, lines 14 to 62, it is necessary, for potting the fibres, periodically to stop the polygonal rotating wheel on which "troughs" are arranged, that is to say parts of the enclosure of the hollow-fibre apparatus which it is desired to obtain. This method thus exhibits the disadvantage that it is necessary to stop the rotating wheel, which causes time losses and variations in the tensions of the fibres.

One object of the present invention is thus to provide a method which does not exhibit the disadvantages of the methods of the prior art. More precisely, one object of the present invention is to provide a method which makes it possible independently to obtain either bundles of hollow fibres potted at both their ends, or bundles of hollow fibres each potted in part of the enclosure of each final hollow-fibre apparatus, or bundles of hollow fibres potted at their end and each held by an internal element (for example a baffle) of the hollow-fibre apparatus which it is desired to obtain.

Another object of the present invention is to provide a method which makes it possible simultaneously to obtain a plurality of potted bundles.

Another object of the present invention is to provide a method for potting hollow fibres which can be automated.

A still further object of the present invention is to provide a method which ensures that each fibre is coated with glue.

According to the present invention, we provide a method of simultaneously producing a plurality of bundles of hollow fibres potted at their ends, said method comprising the steps of:

(a) providing a wheel having a polygonal periphery;

(b) mounting a channel on each side of the wheel, with the open side of the channel facing radially outwardly;

(c) rotating the wheel about its axis;

(d) feeding at least one hollow fibre, so that it is engaged in each channel as the wheel rotates and a bundle of fibres is built up in each channel;

(e) applying glue at spaced intervals to said at least one fibre upstream of the point at which it engages in the first channel mounted on the wheel, the glue applied to the fibres serving to pot the fibres at at least one point in each channel as the fibres build up in each channel; and (f) after the desired number of fibres has been built up in each channel, cutting the fibres at points near to where the fibres have been potted.

In this specification, the expression "hollow fibres" denotes fibres which are generally of tubular shape and which possess, at their centre, a continuous channel arranged approximately along the axis of the fibre. The fibres can optionally be of ellipsoidal or polygonal cross-section. The fibres which can be used can be of any known type and made of any natural, artificial or synthetic material. They can even be made of glass or silicone. In particular, the fibres can be those mentioned in French Pat. Nos. 1,307,979, 1,586,563 and 2,017,387 and U.S. Pat. No. 3,674,628. These fibres can be homogeneous, microporous or anisotropic (that is to say with a skin). They can be obtained by a melt process, by a dry process (evaporation of the solvent) or by a wet process (coagulation). The precise nature of the fibres is chosen according to the application envisaged for the final apparatus, and, for simple heat-exchange operations, the hollow fibres used will of course be impermeable to the fluids circulating on their outer and/or inner walls and will be made of materials such as those described, in particular, in U.S. Pat. No. 3,315,740.

The external diameter of the hollow fibres used in the method according to the present invention depends on the purpose for which the hollow-fibre apparatus in which the bundle is to be placed will be used. If this apparatus in used for simple heat-exchange operations or, for example, for recovering the heat provided by solar energy, the hollow fibres can have a diameter of between 0.3 and 3 mm and their walls can have a thickness of between 0.1 and 1 mm. For apparatuses used in the medical field, such as, for example, artificial kidneys or lungs, the external diameter of the fibres is generally less than 750 microns, preferably less than 500 microns and generally more than 5 microns. Their wall thickness is then generally between 1 and 100 microns.

The word "bundle" is used to mean sections of hollow fibres which are virtually identical as regards their length, the sections being potted at each of their ends. The bundles can have any cross-section; they are generally of circular cross-section, but they can also be of square or rectangular cross-section. Furthermore, the hollow fibres in a bundle are not necessarily all mutually parallel. They can consist of twisted arrangements, such as those described in French Pat. No. 73/20,040 and its Certificate of Addition No. 74/11,674. Furthermore, in a bundle of rectangular cross-section, for example, the successive layers of fibres are advantageously slightly interlaced by virtue of the movement of a filament guide acting during the formation of the hank on the rotating device, according to a technique which is well known in the textile industry.

In order that the present invention will be understood more clearly, the following description is given, merely by way of example, reference being made to the accompanying drawings, in which:

FIG. 2 is a side elevation of part of another embodiment of equipment for carrying out the method of the invention;

FIG. 3 is a side elevation of part of a preferred embodiment of equipment for carrying out the method of the invention;

FIG. 4 is a section along the longitudinal axis of a hollow-fibre apparatus which can be obtained with the method according to the present invention; and FIG. 5 is a cross-section of the apparatus of FIG. 4, along V—V.

Figure 1:
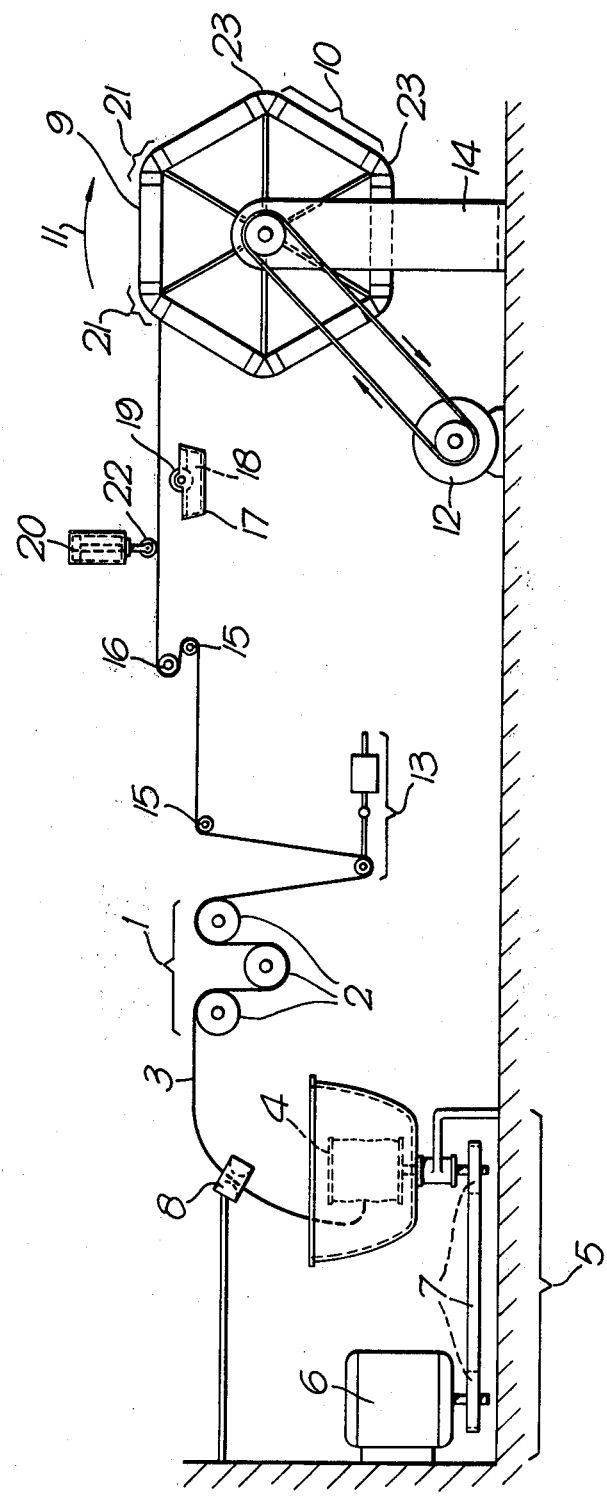
FIG. 1 is a side elevation of one embodiment of equipment for carrying out the method according to the present invention.

The equipment shown in FIG. 1 comprises an unwinding device 1 including three drive cylinders 2, for unwinding the fibres 3 from a bobbin 4 by drawing the fibre along, for example at constant speed. On this bobbin 4, there are two hollow fibres which can be twisted together, as described in French Pat. No. 73/20,040 and its Certificate of Addition No. 74/11,674. The bobbin 4 is integral with a twisting device 5 including a motor 6 and gears 7 which make it possible to twist the fibres 3 whilst they are being drawn along by the cylinders 2. Thus, the fibres 3 on the bobbin 4 may or may not already be twisted together. If the hollow fibres are already twisted, the device 5 can make it possible, if desired, to increase, reduce or maintain the degree of twisting of the hollow fibres on the bobbin 4 as they advance towards the device 1. The fibres 3 pass through a filament guide 8 on leaving the bobbin 4. From the unwinding device, the hollow fibres 3 are directed towards a rotating device 9 consisting of a polygonal wheel on which channels 10 are arranged, in which the hollow fibres 3 are placed during the rotation of the wheel 9 in the direction of the arrow 11. These channels 10, which are shown more clearly in FIG. 5, have a "trough-shaped" cross-section, that is to say that their internal cross-section has an approximately rectangular shape. These channels 10 are fixed by any known means to the rotating wheel 9—see, for example, U.S. Pat. No. 4,038,190—which is driven by a motor 12. This rotating wheel, which is supported by the frame 14, is driven at variable speed because the perimeter of the hank of hollow fibres 9 increases as the fibres are laid in the shells 10. Arrangements are preferably made for the hollow fibres 3 to be laid in the shells 10 with a constant tension of the fibres 3, this tension generally being chosen as low as possible. A device 13 for regulating the tension of the fibres 3 is provided for this purpose, the device 13, which also advantageously serves to absorb jolts, being connected to a potentiometer which controls the speed of rotation of the motor 12 and hence of the rotating wheel 9. Between this device 13 and the rotating wheel 9, there are mounted: idler cylinders 15, a filament guide 16 for distributing the fibres 3 over the whole width of the channels 10. Downstream of guide 16 is a glueing tank 17 filled with glue 18 and provided with a roller 19 for coating the fibres 3 as they advance towards the rotating wheel 9. A control jack 20, upstream of tank 17, has a cylinder 22 mounted thereon, for cyclically lowering the fibres until they come into contact with the roller 19 for a predetermined time, which depends on the speed of advance of the fibres 3 and on the potting zone 21 desired between two consecutive channels 10. The positioning of the glueing roller 19 relative to the rotating wheel 9 depends on the potting zones 21 desired on the hank.

The manner in which the method is carried out thus follows simply from the use of the equipment described above and shown in FIG. 1. When each channel 10 is filled with fibres 3, as shown in FIG. 5, in order to obtain each bundle, the hank is cut at 23 between each channel 10, after the rotation of the wheel 9 has been stopped. However, it is possible, if desired, to place a cover 24, provided with ribs 25 for example—see FIG. 4—over each channel 10 filled with fibres 3, before cutting the hank between two consecutive channels 10 arranged on the rotating wheel 9. FIG. 4 shows a final apparatus which can be obtained after cutting the hank and placing the two tubes 27 and 28 at the ends of the channel 10, near the potting masses 21a and 21b. In an apparatus of this type, a fluid circulates inside the hollow fibres, entering through the tube 27 and leaving through the tube 28, whilst another fluid circulates outside the fibres, entering the apparatus through a tube 29 and leaving through a tube 30. These fluids can be, for example, blood and a dialysis liquid, or blood and a gaseous mixture containing oxygen.

Numerous variants of the method described above will be appreciated by those skilled in the art. Firstly, it must be pointed out that it is possible to wind around the rotating wheel 9 fibres which are not twisted together, although it is frequently advantageous, for a final apparatus, such as the one according to FIG. 4, to have fibres in the form of twisted arrangements for better circulation and distribution of the fluid circulating outside the fibres. If fibres which are not twisted together are used, it suffices to unwind the hollow fibres perpendicular to the longitudinal axis of the wind-off bobbins, as is known, for example, from U.S. Pat. No. 4,038,190. If the hollow fibres 3 are not twisted, it suffices to wind a single fibre around the rotating wheel in each channel 10. However, it is advantageous to wind several fibres at once in the same channel 10 because, in this case, whilst having the same production efficiency of the equipment, it is possible to cause the wheel 9 to rotate less rapidly, which allows a greater precision of the potting zones 21.

If desired, the equipment for carrying out the method according to the present invention can comprise two or more rotating wheels 9, functioning together, arranged for example on one and the same axle on either side of the frame 14. On each wheel 9, there can be several channels 10 next to one another, which makes it possible to obtain several channels 10 filled with hollow fibres for each side of each polygonal wheel. Likewise, on each side of the polygonal wheel, there can be several channels aligned with one another.

The equipment for carrying out the method according to the present invention also makes it possible to obtain bundles glued at their ends, the bundles not being integral with the channels in which they are formed, after the hank of hollow fibres 3 has been cut. To do this, whilst retaining the same rotating wheel 9, it is possible to choose a glue 18 which does not adhere to the glueing zones 21 in the channels 10. In a different method, it is possible to apply a grease, for example based on silicone, to the corresponding part of the channel 10, or to place in the channel 10, at the potting points, a dry film obtained, for example, from the coating glue 18 from the tank 17. Thus, this dry film does not adhere to the ends of the channels 10, and each potted bundle can easily be withdrawn after the hank has been cut between the consecutive channels 10. If it is desired to obtain bundles independent of any support, the channels can have a semi-circular cross-section for example, the filament guides 16 making it possible to obtain a hank (and hence bundles) of circular cross-section. If it is desired to obtain bundles independent of any element of the final hollow-fibre apparatus, it is obviously possible to dispense with channels 10, and it suffices to provide means for supporting the hank at each of its corners only. The glues used are known and are based, for example, on epoxy resin, polyurethane or silicone.

With the method according to the present invention, it is possible to obtain each glued bundle integral with an element of the final hollow-fibre apparatus, as has already been shown for the equipment of FIG. 1. However, an element of this type can also be a frame, such as, for example, those described in U.S. Pat. No. 3,993,816. The frames used, such as those shown in FIGS. 1 to 5 of the abovementioned patent, can be provided with a potted bundle on one of their faces and then be placed back on the rotating wheel 9 in order to provide them with a bundle on the other face. An element of this type can also be a frame such as those described in French Pat. Nos. 2,405,735, 2,405,736 and 2,405,737. Moreover, an element of this type can be a shell containing separate compartments for bundles, as shown and described in French Pat. No. 2,323,427.

Although the equipment according to FIG. 1 has been described as having a device for giving the rotating wheel 9 a variable speed, it is nevertheless possible to omit the unwinding device 1 with cylinders 2 and to operate with a constant speed of the rotating wheel 9, as is the case for the equipment shown in FIG. 14 of U.S. Pat. No. 4,038,190. As a variant, it is also possible to provide two glueing tanks 17 spaced apart so that, for each impulse of the jack 20, the fibres are glued at points corresponding to two successive glueing zones 21 on the rotating wheel 9.

FIG. 2 shows another embodiment of equipment for carrying out the method according to the present invention. In this equipment, there is no jack 20 for lowering the fibres onto the glueing roller 19 of the tank 17 of glue 18, as is the case for the equipment according to FIG. 1. The fibres 3 are applied against the glueing rollers 19 of the two tanks 17 by virtue of the movement of the rotating wheel 9 itself, which is such that the fibre 3 moves towards or away from the said rollers 19. In this process, the channels 10 are located on a triangular rotating wheel 9 having large sides. The hank 26 of hollow fibres is not glued over its whole length between two consecutive shells 10. In this case, in order to obtain the bundles, the hank is cut near the points where the bundles have been potted, for example between two successive pottings. As the hank 26 builds up in the channels, a plate 31 supporting the two glueing tanks 17 is advantageously raised in the direction of the arrow 32 in order to keep the level of the tanks constant relative to the level at which the hollow fibre 3 is laid in the channels 10. Furthermore, during the formation of the hank on the rotating device 9, the faces of the potting zones tend to become oblique relative to the longitudinal axis of each bundle in preparation. This originates from the fact that the perimeter of the hank increases as the latter is formed. To obtain potting faces which are perpendicular to the longitudinal axis of each bundle, it is possible, for example, to move the plate 31 away in the direction of the arrow 36, towards the supply of hollow fibres, as the hank is formed. A possible method by which the plate 31 is moved in the direction of the arrow 36 at the same time as it is raised in the direction of the arrow 32 consists in placing the plate 31 on the upper arm of a deformable parallelogram. As a variant, instead of raising the plate 31, it is possible progressively to lower the rotating wheel.

FIG. 3 illustrates preferred equipment for carrying out the method according to the present invention, this equipment being shown at the moment when the channels 10 are virtually filled by the hank of hollow fibres 3. In this equipment (of which the motor 12 for driving the rotating wheel has not been shown, in order to simplify the drawing), the majority of the elements of the equipment of FIGS. 1 and 2 are found again, with the same reference numbers. As in the equipment according to FIG. 2, the glueing tank 17 is raised in the direction of the arrow 32 as the channels 10 are filled by the hank of hollow fibres 3. However, to compensate for the increase in the perimeter of the hank whilst the latter is being formed in the channels, and to have the faces of the potting zones (inside each channel) perpendicular to the longitudinal axis of each channel, it is advantageous to provide a device which allows for this increase in the perimeter of the hank during the glueing of the fibres. For this purpose, a disc 33 carrying signals for controlling the jack 20 is arranged on the rotating wheel 9, the signals being represented, for example, by dark zones 34 corresponding to the potting zones 21, these dark zones 34 being detected by a photoelectric cell 35 moving at the same time as the glueing tank 17, the movement of the cell optionally being amplified.

All the variants indicated with respect to the method carried out with the equipment according to FIG. 1 are found again for the methods according to the equipment 2 and 3; in particular, the unwinding device 1 can be omitted and it is possible to obtain independent bundles or bundles which, by virtue of their potting, are integral with elements of the final hollow-fibre apparatus.

We claim:

1. A method of simultaneously producing a plurality of bundles of hollow fibres potted at their ends, said method comprising the steps of:
   (a) providing a wheel having a polygonal periphery;
   (b) mounting a channel on each side of the wheel, with the open side of the channel facing radially outwardly;
   (c) rotating the wheel about its axis;
   (d) feeding at least one hollow fibre, so that it is engaged in each channel as the wheel rotates and a bundle of fibres is built up in each channel;
   (e) applying glue at spaced intervals to said at least one fibre upstream of the point at which it engages in the first channel mounted on the wheel, the glue applied to the fibres serving to pot the fibres at at least one point in each channel as the fibres build up in each channel; and
   (f) after the desired number of fibres has been built up in each channel, cutting the fibres at points near to where the fibres have been potted.

2. A method as claimed in claim 1, wherein said at least one hollow fibre has glue applied thereto by being brought into contact with means for dispensing glue, as said at least one hollow fibre advances towards the wheel.

3. A method as claimed in claim 2, wherein the hollow fibre is glued by being brought into contact with at least one glueing roller dipping in a tank of glue.

4. A method as claimed in claim 3, wherein the tank is raised as the bundle of fibres builds up in each channel.

5. A method as claimed in claim 3, wherein said at least one hollow fibre is brought into contact with a glueing roller by lowering means which lower the said fibre onto the said roller at predetermined intervals.

6. A method as claimed in claim 5, wherein the lowering means lower the fibre so that the contact time increases as hollow fibres build up in the channels, effective to make the potting faces approximately perpendicular to the longitudinal axis of each bundle obtained after cutting the fibres.

7. A method as claimed in claim 6, wherein the contact time of the fibre with the glueing roller is increased as the hollow fibres build up in the channels, by the action of the lowering means in response to light signals detected by a photoelectric cell.

8. A method as claimed in claim 7, wherein the light signals correspond to dark zones arranged on a disc on the wheel.

9. A method as claimed in claim 3, wherein said at least one hollow fibre is brought into contact with the glueing roller by moving the wheel.

10. A method as claimed in claim 9, wherein the glueing roller is moved away from the wheel as the hollow fibres build up in the channels, so that the potting faces of each bundle obtained after cutting are approximately perpendicular to the longitudinal axis of each bundle.